Jan. 1, 1952  H. W. GOFF  2,581,184
REPERFORATING APPARATUS
Filed Sept. 23, 1948  2 SHEETS—SHEET 1
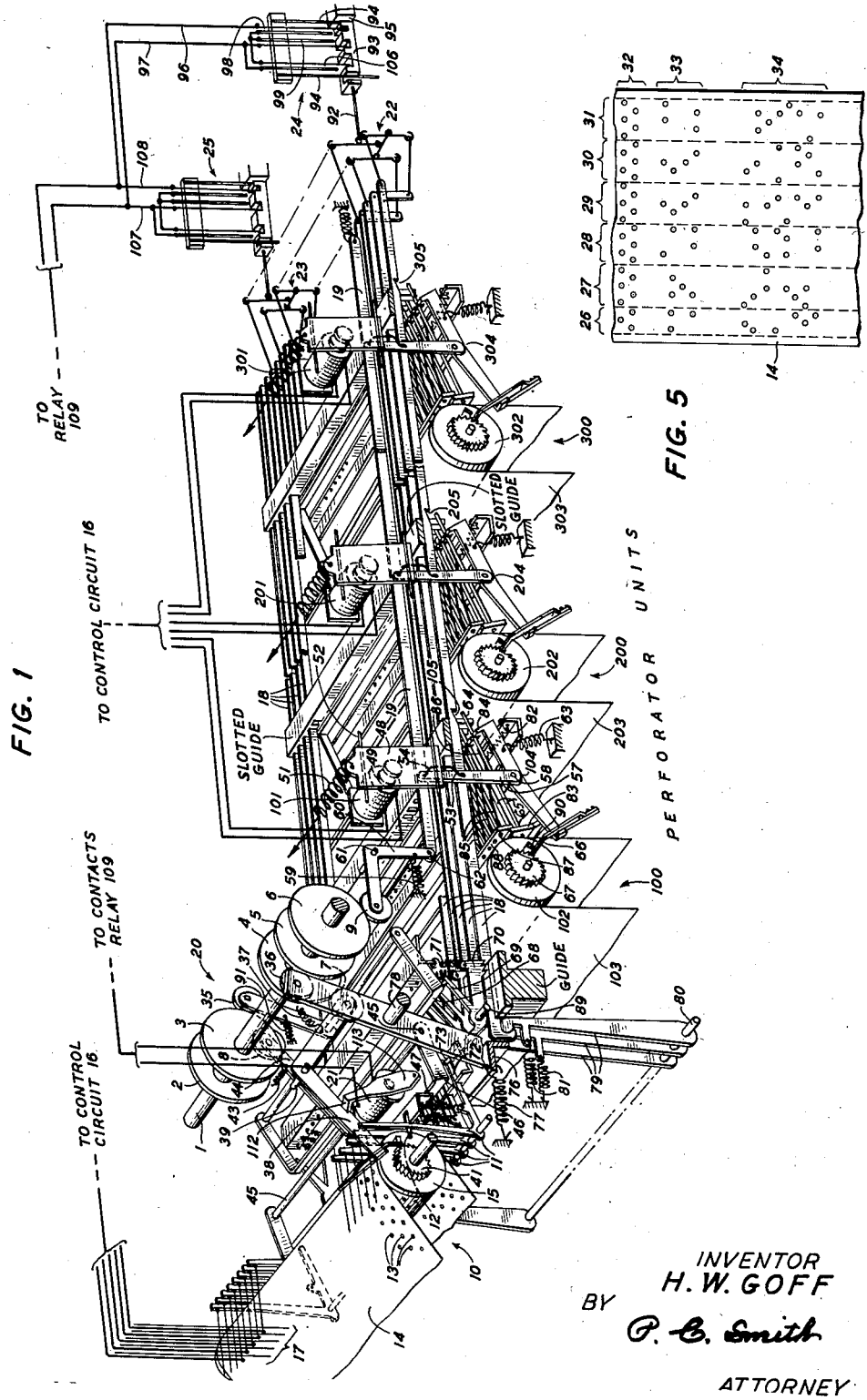
INVENTOR
H. W. GOFF
BY
P. B. Smith
ATTORNEY

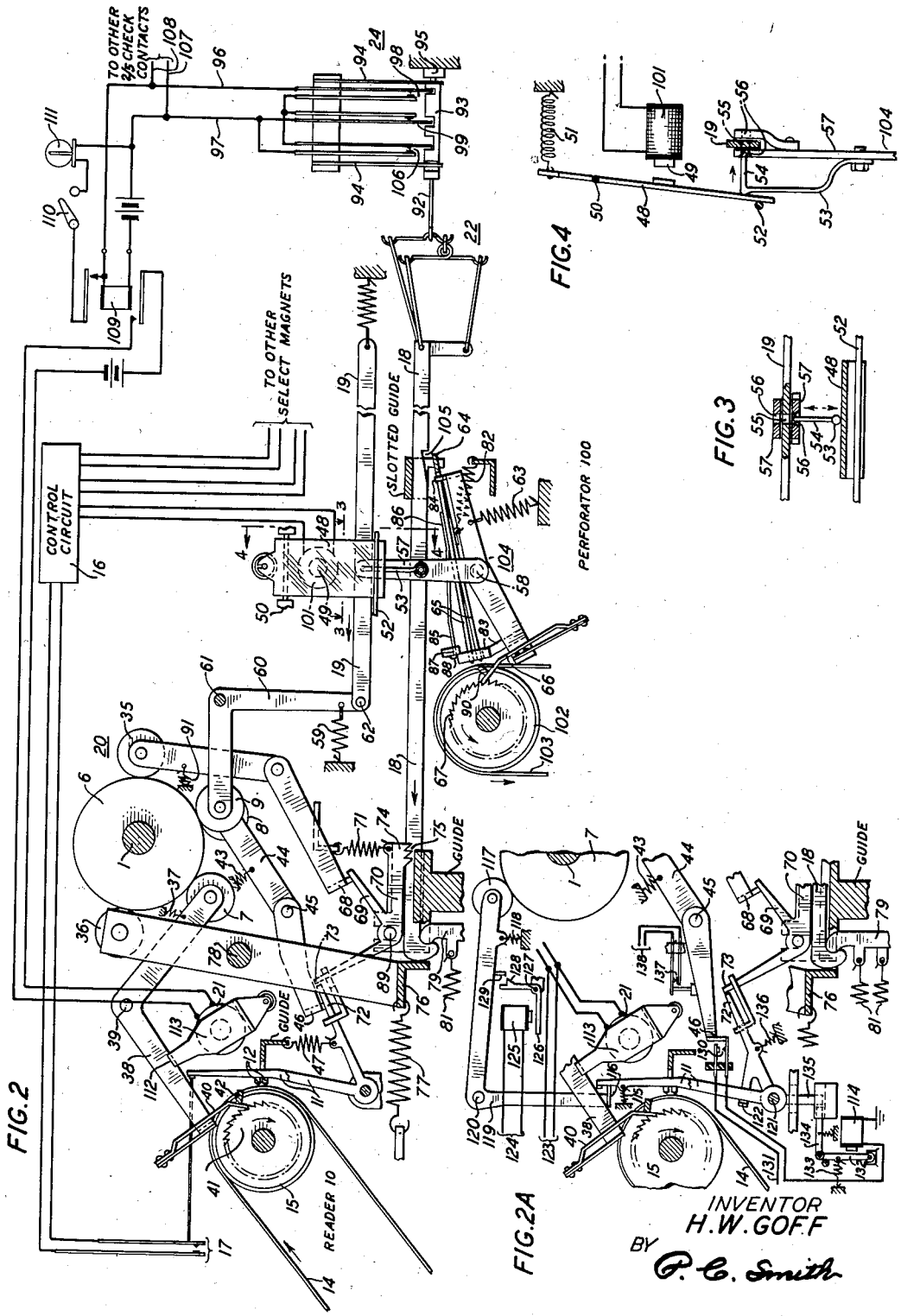

Patented Jan. 1, 1952

2,581,184

UNITED STATES PATENT OFFICE 2,581,184

REPERFORATING APPARATUS

Harold W. Goff, Manhasset, N. Y., assignor to Bell Telephone Laboratories, Incorporated, New York, N. Y., a corporation of New York Application September 23, 1948, Serial No. 50,754

8 Claims. (Cl. 164—115)

This invention relates generally to perforating mechanisms and more particularly to gang reperforators wherein a plurality of perforating units or mechanisms is controlled by a common reading or sensing or otherwise selectively operable mechanism in an electromechanical manner to reproduce selectively in one or more of said units information read or sensed by said sensing mechanism or to produce in one or more of said units information sent thereto from a remote point.

The present invention is specifically useful as a means for sorting coded intelligence punched in random fashion in a record medium, such as a tape. For instance, in automatic message accounting systems for automatic telephone systems a tape may be perforated in a code of intelligence representing items of information pertaining to telephone calls which require subscriber billing. This information, such as calling number, called number, length of conversation, rate of charge, etc., is generally recorded in composite tapes in the form of punched or pierced holes in some convenient code. One such code, used hereinafter as an example, represents information by digits and records these digits as two punched holes out of a possible five. Since such information as the called number, calling number, length of conversation, rate of charge, time of day, etc., are not all available at one time for recording in an orderly manner, such information must be recorded as it is available. Consequently, a composite tape will contain code entries for all calls interspersed at random in time sequence.

It is necessary for accounting and billing purposes to accumulate, on say a single tape, all items of information pertaining to a particular call. Such is the general object of the present invention.

One object of the present invention is to sort the random coded information contained on a composite tape and to reproduce such information on several tapes according to an order or sequence which is intelligible for accounting or billing purposes. Coded information may also be reproduced as transmitted from a remote point.

It is a particular object of the present invention to sort and reproduce the random coded information by means of a novel, compact, electromechanical mechanism.

Briefly the invention comprises a set of cams with associated cam followers and mechanical linkages for controlling the reperforators, a perforated tape containing coded information arranged at random, a tape feed drum and cam operated stepping means for advancing said drum in order to step said perforated tape, a sensing or reading mechanism for sensing at each step position of said drum the coded information punched in said perforated tape, code bars controlled electromechanically by said sensing mechanism, several reperforator units each provided with an unperforated tape and a tape drum and tape drum stepping means and a punching mechanism, said punching mechanism normally in an inoperative position, each reperforator unit provided with a selecting means controlled by a certain part of each set of coded information, a common oscillating select bar, said selecting means arranged under control of said certain part of each code set to change the position of a selected reperforator unit's punching mechanism such that the aforesaid code bars may actuate said mechanism to thereby punch said code in the tape of a selected reperforator unit, said punching mechanism effective when its position is changed to advance the associated tape drum one step.

Other features of the present invention, such as selective response to remote control, will be apparent from the following detailed description of an embodiment thereof. The exemplary embodiment is illustrated in the drawings forming a part of this disclosure and which drawings are described generally as follows:

Fig. 1 shows one form of the invention in perspective;

Fig. 2 shows a side elevation of the mechanism of Fig. 1 on a larger scale and simplified in certain respects;

Fig. 2A shows a modified code bar control means for remote control;

Fig. 3 is a cut-away section along the lines 3—3 of Fig. 2;

Fig. 4 is an enlarged view of part of the selecting mechanism of Fig. 2 and taken in the direction of 4—4 of Fig. 2; and Fig. 5 shows, in part, a typical composite perforated tape.

GENERAL DESCRIPTION

The embodiment of the present invention described herein by way of example is composed of the following principal parts:

(1) A reader or sensing mechanism 10 provided for the purpose of determining by means of the sensing fingers 11 and sensing pins 12 thereon which perforation positions comprise holes, such as 13, in each row of perforation positions in the composite tape 14 for each stepped, or sensing position of reader tape drum 15.

(2) A control circuit 16 responsive to a code signal from certain of the sensing finger contacts, such as 17, to actuate one or more select magnets, such as 101 for perforator unit 100, in accordance with the said code signal. Such a control circuit is fully disclosed in patent 2,558,476 to W. W. Carpenter and J. W. Gooderham of June 26, 1951, and concerning "District Assembler Circuit," which disclosure is to be considered a part of the present disclosure.

(3) Several perforator units, such as 100, 200 and 300, comprising generally tape drums 102, 202 and 302 for advancing unperforated tapes 103, 203 and 303, and combined pivotal punching and drum stepping assemblies 104, 204 and 304 whereby, under control of select magnets 101, 201 and 301 and code bars, such as 18 (to be described), the individual unperforated tapes 103, 203 and 303 may be perforated such that the random coded information prepunched in reader tape 14 can be repeated on several tapes, such as 103, 203 and 303 in some definite order or sequence, as will be described.

(4) A series of code bars, such as 18, common to all perforator units, such as 100, 200 and 300, and under the control of sensing fingers 11 of reader 10 whereby, by means of notches, such as 105, 205 and 305 in code bars 18, said code bars, if moved, can effect the perforating of holes in perforator tapes 103, 203 and 303 depending upon which select magnets 101, 201 or 301 are operated.

(5) An oscillating select bar 19 common to all perforator units, such as 100, 200 and 300 to which, under the control of select magnets 101, 201 and 301, one or more of the pivotal punching and drive assemblies 104, 204 or 304 may be latched in order that such assembly or assemblies may be seasonably pivoted into operative relationship with code bars 18 depending upon the response of control circuit 16 to the actuation of sensing finger contacts 17 of reader 10.

(6) A cam drive mechanism 20 common to all mechanisms of the combined gang reperforator of Figs. 1 and 2 to provide positive mechanical driving force to all moving parts of the embodiment, with the exception of the latching actions of select magnets 101, 201 and 301 and reader blocking magnet 21.

(7) Mechanical checking devices, such as 22 and 23, for checking correct code bar action. The coded information punched in composite tape 14 in the present example is the well-known two-out-of-five code whereby digital information is represented by a code of two punched holes out of a possible five hole punching position. The devices, such as 22, are associated with each group of five code bars 18 and by means of linkage action (to be explained) control associated contact assemblies 24 and 25 such that if any group of five code bars 18 exhibits any combination of movements other than exactly two of said bars in motion the contact assembly, such as 24, will effect operation of blocking magnet 21 to block the stepping of reader drum 15, thereby to prevent further forward action of the reperforator until the incorrect code bar movement has been investigated and the cause of such improper action remedied.

Other features of the invention will be apparent from the subsequent detailed description of the construction and operation of the disclosed embodiment of the invention.

GENERAL OPERATION

Fig. 5 illustrates what a portion of a typical reader tape 14 might look like if the illustrated punched code conformed to intelligible information. No attempt has been made to make the illustrated punched holes conform to any particular intelligence. A typical tape 14 has six longitudinal columns 26, 27, 28, 29, 30 and 31. These columns are imaginary in actual practice. Crosswise of said tape 14 are what are called "line entries." A "line" consists of twenty-eight hole positions such as 32. Actually a "line" is two rows staggered in order to be able to more closely space sensing fingers 11 and punch pins in perforators. Each column, except column 26, contains exactly five hole positions of which only two are punched in accordance with the two-out-of-five code used herein by way of example. Column 26 contains three hole positions which are punched according to certain control signal codes. Thus, in all, there are twenty-eight punch positions and thus the reader 10 contains twenty-eight sensing fingers 11 and the mechanism as a whole has twenty-eight code bars 18. Likewise there will be five checking assemblies, such as 22 and 23.

The information recorded in such a composite tape as 14 for automatic message accounting and billing purposes is recorded on two line entries, such as 33, or four line entries, such as 34, depending upon how much information is required for properly charging a subscriber for the particular call. Each two or four line entry is punched on tape 14 at certain significant points in time. For instance, an initial entry is made when a calling subscriber initiates a call, a second entry is made when the called subscriber answers and a final entry is made when the conversation ends. Other entries may be made if desired. Thus, if tape 14 contains entries for a large number of calling subscribers the various entries pertaining to a particular subscriber will be in random sequence along the length of the tape which corresponds to passage of time. It is for the unscrambling and sorting and rearranging in an orderly manner of such random coded information that the present invention is useful.

In order to sense or read the random coded intelligence and reperforate such codes in an orderly manner, it is necessary to select one or more reperforators, such as 100, 200 or 300, for reproduction of perforations sensed in tape 14 and belonging together in sequence for billing purposes. Such reproduction, or "sorting" as it is frequently referred to, is capable of being accomplished according to many procedures. One such procedure is to sort by calling subscribers' numbers. Such sorting requires many passages of tapes through reperforating machines in order to sort by thousands digits, hundreds digits, tens digits, units digits, etc. Each reperforator, such as the gang reperforator shown in Figs. 1 and 2, may be arranged such that the sensing finger contacts 17 of the readers will furnish the control circuit 16 with the coded information lying within certain lines and columns of the tape 14 according to the sorting procedure. The control circuit 16 will then effect the selection of the proper perforator 100, 200 or 300 for the reproduction thereby of such information as corresponds to the sorting procedure.

The foregoing brief description of sorting operations is well known to those familiar with such methods of automatic message charging, accounting and billing and is more fully described in the above identified Carpenter-Gooderham patent.

DETAILED DESCRIPTION

Since it is believed that the construction and operation of the disclosed embodiment of the invention will be understood best from a detailed description of its functioning, the following functional description is set forth with that aim or purpose.

Cam shaft

No attempt has been made in the drawings to define the shapes of the cams 2, 3, 4, 5 and 6 secured to main drive shaft 1; nor, has there been any attempt to specify the direction of rotation or speed of shaft 1; nor, are the lengths of lines and pivot arms intended to be limiting. The proper timing of the functioning of the apparatus will be specified sufficiently to make understandable the proper construction and functioning of the camming mechanism.

Reading or sensing

It is assumed for the purposes of subsequent description that a composite tape 14 has been prepared in the normal course of business in an automatic telephone office and that a particular procedure of sorting has been decided upon whereby the sensing finger contacts, such as 17, comprise the sorting signal means for directing the control cricuit 16.

The positions of the apparatus of Figs. 1, 2, 3 and 4 represent the normal positions just subsequent to the instant when reader drum 15 has been stepped one step clockwise to present to the reader 10 a fresh line of coded information to be sensed.

Cam follower roller 7 is depressed by cam 4 against the restraining action of spring 37 to rotate drive pawl arm 38 clockwise about pivot 39 to thereby engage spring drive pawl 40 with the succeeding tooth on ratchet wheel 41 secured to drum 15. When cam 4 permits roller 7 to be raised under the action of spring 37 the pawl arm 38 will rotate counterclockwise to its normal position and in so doing will advance drum 15 one step clockwise through the agency of pawl 40, stop 42 and ratchet 41. One step advance of drum 15 represents the advance of one so-called "line" of punch positions on tape 14.

Next, cam follower roller 8 is depressed by cam 2 against the action of spring 43. The depression of cam 8 rotates arm 44 clockwise about pivot 45 to rotate bail 46 clockwise to thereby release all of the sensing fingers 11. All sensing fingers 11 attempt to rotate counter-clockwise under the action of their individual springs 47. Only those fingers 11, however, whose sensing pins 12 find perforations in tape 14 opposite their ends, will actually rotate to any extent. Those fingers 11 which do rotate accomplish at least two things; namely, actuate their corresponding contacts 17 and unlock for movement the corresponding code bars 18, as will be discussed. Those fingers 11 which do not rotate appreciably will lock corresponding code bars 18 against movement.

Selecting a perforator

As previously outlined with reference to the above identified Carpenter-Gooderham patent the operation of signal code contacts 17 will effect the operation of one or more select magnets 101, 201 or 301. Assuming that magnet 101 is operated, with reference to Figs. 2, 3 and 4 in particular, armature 48 will be attracted to core 49 by pivoting about pivot 50 against the restraining force of spring 51. In the normal position of armature 48, as illustrated in Fig. 4, a stop 52 limits the released position of armature 48 and thus determines the normal released position of wire spring 53. Spring 53 is rigidly secured to the combined stepping and punching mechanisms 104 of perforator 100 and is normally, by reason of its own resilience, biased to such position that its upper horizontal pin extension 54 is retracted from engagement with hole 55 in the oscillating select bar 19. Select bar 19 is therefore free to oscillate (horizontally in Fig. 2) freely with respect to assembly or mechanism 104 when select magnet 101 is not energized. When armature 48 is attracted to core 49 of select magnet 101, as above, pin extension 54 of wire spring 53 is inserted through the aligned holes 55 and 56 of select bar 19 and the vertical arm 57 of mechanism 104. When the oscillating select bar 19 subsequently moves to the left in Fig. 2 it will rotate the mechanism 104 counterclockwise about pivot 58, since arm 57 is arranged in any known manner to rotate mechanism 104 as said arm 57 is itself rotated, to effect a selection of mechanism 104 of perforator 100. It will be obvious that pin 54 of the wire spring 53 may require clearance in hole 55 depending upon the extent and type of motion, etc., of bar 19. When select magnet 101 is released the pin extension 54 of wire spring 53 is withdrawn from engagement with select bar 19 to release perforator mechanism 104. Of course, other such mechanisms could be selected and released simultaneously if desired as will be understood depending upon the control exercised by control circuit 16 over the various select magnets 101, 201 and 301, etc.

After perforator mechanism 104 has been selected, cam follower roller 9 is raised on cam 6 under the action of spring 59 to rotate arm 60 clockwise about pivot 61. When arm 60 is thus rotated about pivot 61, select bar 19 is moved to the left in Fig. 2 through the agency of the free pivot pin 62. Such movement of the select bar 19, to which perforator mechanism 104 is latched through the agency of vertical arm 57 and wire spring pin extension 54, will rotate arm 57 and the entire perforator mechanism 104 about pivot 58 against the action of spring 63 such that the right-hand ends 64 of perforator punch pins 65 engage slots 105 in code bars 18. In the same operation of mechanism 104 the drive pawl 66 is engaged with the succeeding tooth of ratchet 67 secured to drum 102 in preparation for stepping the drum 102 and tape 103 upon the release of mechanism 104.

Code bar operation

Subsequent to the selection of a perforating mechanism, such as 104 as above, cam follower 35 is operated by cam 3 to thereby rotate bail 68 clockwise away from the extensions 69 of the code bar locking levers 70. Under the action of springs 71, all code bar locking levers 70 will rotate counterclockwise about pivots 89 provided the corresponding extensions 72 of the corresponding sensing fingers 11 have been elevated out of the paths of the extensions 73 of the code bar locking levers 70. Those code bar locking levers 70, corresponding to sensing fingers 11, whose sensing pins 12 have engaged in holes 13 in tape 14, will rotate to disengage the teeth 74 thereof from the mating teeth 75 in the associated code bars 18. The only mechanism which now prevents those unlocked code bars 18 from moving to the left in Fig. 2 is the bail 76.

At approximately this time in the sequence of cam operations, cam follower 36 is permitted to lower on cam 5 under the action of spring 77 so that the bail 76 is rotated clockwise about pivot 78 to release the unlocked code bars 18. Each unlocked code bar 18, which, it will be remembered, corresponds to a sensing pin 12 which entered a perforation 13 in tape 14, will at this stage be moved leftward in Fig. 2 under the action of lever 79, pivoted counterclockwise about pivot 80, under the force of spring 81.

Perforator punching

When the unlocked code bars 18 are moved leftward in Fig. 2, the notches 105 therein engage corresponding ends 64 of punch pins 65 of the selected perforator mechanism 104 and drive those punch pins 65 into the unperforated tape 103 of perforator 100. These punch pins 65 are actuated against the action of individual springs 82 and are guided in combs or guides 83 and 84. The normal positions of punch pins 65, as illustrated in Fig. 2, are determined by individual wire springs 85 which are secured at 86 to their respective punch pins 65 and are slidably engaged in holes 87 in comb or guide 83. A lip 88 on the left-hand end of each spring 85 determines the normal stop positions of punch pins 65 under the action of springs 82.

Release to normal

Cam follower 36 may be raised first whereupon code bars 18 are returned to normal by bail 76 against the restraining action of springs 77 and 81. Thereafter cam follower 9 may be depressed to return select bar 19 to normal to thereby rotate perforator mechanism 104 clockwise to normal. When mechanism 104 returns to normal it steps drum 102 a step counterclockwise through the agency of pawl 66, stop 90 and ratchet 67 to present the punch pins 65 of perforator 100 with an unperforated section of tape for the next entry thereon.

Code bars 18 and the select bar 19 may be returned to normal simultaneously in order to save time provided the comb 83 which guides punch pins 65 is provided with vertical slots such that the left-hand ends of punch pins 65 may follow the holes in tape 103 as drum 102 steps one step clockwise before the punch pins are fully withdrawn therefrom by springs 82.

After code bars 18 and select bar 19 are returned to normal, cam follower 35 is permitted to lower on cam 3 under the action of spring 91 to thereby return the code bar locking levers 70 to normal by means of bail 68 and to thereby lock said code bars 18 through the agency of the mating teeth 74 and 75. The upper ends 73 of the locking levers 70 are incidentally rotated clockwise out of the paths of the extensions 72 of the sensing fingers 11 which are forced thereafter to return to normal under the action of bail 46 when cam follower 8 is lowered on cam 2 under the action of spring 43.

When sensing fingers 11 are returned to normal the contacts 17 associated therewith are opened, or otherwise actuated, to signal the control circuit 16 to release select magnet 101, and any other select magnets, such as 201 or 301, which may have been operated also. The release of select magnet 101 disengages the perforator mechanisms 104 from select bar 19.

Finally, cam follower 7 is permitted to lower on cam 4 under the action of spring 37 to thereby step the drum 15 one step clockwise through the agency of the lever 38, pawl 40, stop 42 and ratchet 41.

Check on code bar operation

Each group of five code bars is mechanically connected to a linkage, such as 22, for the purpose of checking proper two out of five operation of such groups of code bars 18. The end of each code bar 18 is connected to a different one of five points in linkage 22. A sixth point of linkage 22 is connected to a wire or rod 92 which in turn is secured to a contact spring actuating card 93 whose normal position is determined by bias springs 94 and a stop 95.

The linkage 22 is so constructed that: if only one code bar is moved the wire 92 will move one-fifth of the distance that the code bar moved; if two code bars move, the wire 92 will move two-fifths of the distance one code bar moved; if three code bars move, the wire 92 will move three-fifths of the distance one code bar moved; and so forth.

The contact arrangement 24 is constructed such that there will be a continuous circuit therethrough from conductor 96 to conductor 97 whenever wire 92 is moved any distance other than that representing movement of only two code bars 18. That condition (other than two out of five code bars moved) will be recognized as a faulty operation of the mechanism. When only one code bar 18 moves the make contacts 98 are closed to complete the circuit mentioned over the break contacts 99. When two code bars 18 move, then the make contacts 98 are closed but break contacts 99 are opened to thereby open the circuit. If three or more code bars 18 operate, then make contacts 106 close to bridge the open contacts 99 to again complete the circuit. Whenever the conductors 96 and 97 are completed in circuit through the contact arrangement, thus indicating incorrect operation of the mechanism, or for that matter, whenever the conductors 107 and 108 from any other checking contact arrangement for other groups of five code bars are completed in said circuit, the operation of relay 109 results as is obvious. Key 110 may be kept closed to provide a locking circuit for relay 109 and to provide a visual or audible signal 111. The operation of relay 109 completes an obvious circuit for energizing the latch magnet 21. At the time when code bars 18 are moved the lever arm 38 which carries the drive mechanism for drum 15 will be in its clockwise rotated position as above described. Since said lever arm 38 is rotated clockwise from its normal position in Fig. 2, the right angle extension 112 on the end of armature 113 of magnet 21 will be moved to a position just below lever arm 38 such that said lever arm 38 cannot return to normal due to the interposition of armature extension 112 in its return path. If said lever 38 cannot return to normal at the proper time the drum 15 will not be advanced and the mechanism will repeatedly read the same line until the fault is corrected.

Code bar control from a remote location

Referring particularly to Fig. 2A, an arrangement is shown which modifies the code bar control mechanism of Fig. 2 so that said code bars 18 may be actuated or enabled by a source external of the gang reperforator mechanism. Apparatus elements which are unchanged from Fig. 2 to Fig. 2A are indicated by the same reference numbers.

In order that the gang reperforator be controllable from a remote location rather than from a perforated tape, such as 14, through the agency of sensing fingers 11, the apparatus arrangement of Fig. 2A may be employed in lieu of the corresponding portion of Fig. 2. Fig. 2A provides added flexibility to the whole mechanism since it will operate in the same overall manner as previously described in connection with a perforated tape control medium such as 14 and it will also operate from a remote location through the agency of magnets, such as 114, to perforate in perforator units, such as 100, 200 and 300 coded information translated through the agency of magnets 114 into motion of code bars 18.

Certain rearrangement of elements of the code bar control mechanism of Fig. 2 and addition of new elements thereto characterizes the more flexible mechanism of Fig. 2A. The sensing fingers 11 are moved toward the tape 14 under the action of springs 115 when bail 116 is rotated out of the paths of sensing fingers 11. The bail 116 is so rotated clockwise when a new cam follower roller 117 is lowered on a new cam 7 under the action of a spring 118 to thereby rotate bail arm 119 clockwise about pivot 120. The extensions 72 of sensing pins 11 of Fig. 2 are separate from the corresponding sensing fingers 11 of Fig. 2A and may rotate about pivot 121 independently of sensing fingers 11. However, if normal tape sensing is employed, whereupon sensing fingers 11 are permitted to move counterclockwise about pivot 121, said sensing fingers 11 will engage tangs 122 on corresponding members 72 to thereby rotate said members 72 in exactly the same manner as in Fig. 2 when bail 46 of Fig. 2 was removed from its holding position as shown in Fig. 2.

When, however, it is desired to control the mechanism of the reperforator from a remote location the sensing and stepping mechanisms of reader 10 must be immobilized. Leads 123 may be energized from the remote location to disable the stepping mechanism of reader 10 as above explained in connection with the two-out-of-five check circuit of Fig. 2. Leads 124 may be energized as well to operate a magnet 125. The armature 126 of magnet 125 will rotate about pivot 127 to interpose a stop 128 into the path of projection 129 on bail arm 119 to prevent the release of sensing fingers 11 by bail 116. There is provided one magnet 114 for each code bar 18 and the circuit therefore extends over contacts 130 and lead 131 to said remote location. The contacts 130 are pretensioned normally to closed position but are held open by bail 46 until said bail 46 is rotated away to permit contacts 130 to close. Such movement of bail 46 will correspond in timing to the same movement of the same bail 46 of Fig. 2 which unlocked code bars 18. It is assumed that the magnets 21 and 125 have been operated as above explained and that the cam shaft 1 is in operation and that certain of the 28 leads 131 have been energized by battery at the remote location in accordance with coded information to be perforated in one or more of perforators 100, 200, 300 etc. At the proper time, as previously explained in connection with the discussion of Figs. 1 and 2, bail 46 will be raised away from contacts 130 which thereupon close to energize all magnets 114 whose leads 131 have been energized. The operation of magnet 114 attracts its armature 132 against the action of spring 133 to push rod 134 against the lever extension 135 of member 72 to thereby lift the outer end of member 72 out of the path of the code bar locking lever arm 73. The member 72 will rotate under the control of magnet 114 independently of and free of sensing fingers 11 to unlock certain corresponding code bars 18 as previously explained in connection with the mechanisms of Figs. 1 and 2. When bail 46 opens the contacts 130 to effect the release of magnets 114 the springs 136 will return the members 72 to their normal positions to again mechanically lock code bars 18 against movement. Contacts, such as 137, which may be arranged to be closed when bail 46 is normal and open when bail 46 is rotated to allow contacts 130 to close, may be employed as a signal to the remote location over leads 138 for proper synchronization between the timing of the gang reperforator and the means at the remote location for applying battery to leads 131 of magnet 114.

In regard to the operation of select magnets, such as 101, 201, 301, etc. from the remote location, it will be appreciated that the synchronizing contacts 137 may readily control circuits at the remote location (not shown) which can select over leads (not shown) one or more select magnets 101, etc., as desired in accordance with the coded information to be transmitted by battery on leads 131.

Furthermore, the apparatus of the present invention is adapted, merely by elimination of the tangs 122 on the locking levers 72 of Fig. 2A, to enable complete operation through a remote station. The sensed information may be relayed electrically to a remote station where a translating device, such as is disclosed in Patent 2,369,474 to H. P. Luhn of February 13, 1945, can repeat the information over leads 131 or can transmit over leads 131 new or computed or translated information depending upon the nature of the information sent to the remote station by the sensing pin contacts, such as 17. The information received over leads 131 will control the reperforator as above independently of the sensing pins 11; whereas, the movement of the sensing pins 11 is ineffective in controlling the locking levers 72 except through the agency of the remote circuit. Obviously, such remote translation or repetition, as the case may be, can be made rapid enough with respect to the timing of the ratchet mechanisms 38 and of the bail 116 to effect remote operation within a single sensing cycle without necessitating the operation of the blocking magnets 21 and 125.

In addition, it will be appreciated that local sensing pin control over the locking levers 72 can be combined within a translating or computing function, as discussed above, by retaining tangs 122 on the levers 72. The latter arrangement requires the timely operation of the blocking magnet 125, rearranged slightly (not shown), in order to return the depressed sensing pins 11 to their normal positions to in turn release all of the associated locking levers 72 except those independently actuated by magnets 114 whenever the remote translating or computing circuit recognizes an electrical indication from the contacts 17 requesting a translation of the information. This operation of magnet 125 requires a slight modification (not shown) to permit magnet 125, when energized, to exercise a direct force to rotate the arm 119 clockwise instead of merely performing a passive preventative function as disclosed in Figure 2A. Such modification will be obvious. The synchronizing contracts 137 may be used as an indication as to when the remote circuit should relinquish control over magnet 125 and of magnets 114 as previously mentioned.

Since modifications may be made to the exemplary embodiment of the invention within the spirit and scope of said invention, claims are appended which alone define the nature and scope of the present invention.

What is claimed is:

1. A gang reperforator comprising a plurality of perforator units each having an unperforated tape and movable punch pins, a plurality of movable code bars common to said perforator units and corresponding to said punch pins, locking means for each code bar normally locking said code bar against movement, said pins situated with respect to said code bars such that normally no coaction exists therebetween, a selecting mechanism common to all perforator units for selecting at least one of said units by moving the punch pins thereof into position to be actuated by corresponding code bars when said code bars are moved, mechanical means selectively movable to selectively actuate certain of said locking means to thereby unlock certain corresponding code bars, said unlocked code bars arranged to be moved to thereby engage corresponding punch pins of said selected perforator unit for perforating said unperforated tape in accordance with the pattern of locking means actuated by said mechanical means.

2. A gang reperforator comprising a perforated tape sensing mechanism having sensing fingers movable in response to the sensing of perforations in said tape, code bars associated with said fingers and operable in response to movement of corresponding fingers, a plurality of perforator units each having an unperforated tape and movable punch pins corresponding to said code bars, said pins situated with respect to said code bars such that normally no coaction exists therebetween, a selecting mechanism common to all perforator units and operable under control of said sensing fingers for selecting at least one of said perforator units by moving the punch pins thereof into position to be actuated by corresponding code bars, said code bars effective when operated under the control of the movement of said fingers to actuate corresponding punch pins of said selected perforator unit for perforating said unperforated tape in accordance with the movement of said fingers.

3. A gang reperforator comprising a perforated tape sensing mechanism having sensing fingers movable in response to the sensing of perforations in said tape, code bars associated with and corresponding to said fingers and operable in response to movement of corresponding fingers, a plurality of perforator units each having an unperforated tape and movable punch pins corresponding to said code bars, said pins situated with respect to said code bars such that normally no coaction exists therebetween, a common selecting means associable with any of said perforator units, electromagnetic means controlled by said sensing fingers for selecting at least one of said perforator units by operatively associating said selected unit with said selecting means, said selecting means arranged to move said punch pins of said selected perforator unit into operative relationship with corresponding code bars, said code bars effective when operated under the control of the movement of said fingers to actuate corresponding punch pins of said selected perforator unit for perforating said unperforated tape in accordance with the movement of said fingers.

4. A gang reperforator comprising a perforated tape sensing mechanism having sensing fingers movable in response to the sensing of perforations in said tape, code bars associated with and corresponding to said fingers and movable in response to movement of said corresponding fingers, a plurality of perforator units each having an unperforated tape and a movable assembly of individually actuable punch pins associable with and corresponding to said code bars, said assembly situated with respect to said code bars such that normally no coaction exists between said code bars and said punch pins, a common continuously movable selecting mechanism associable with any of said perforator units for moving any of said assemblies, electromagnetic means controlled by movement of said sensing fingers for selecting at least one of said perforator units by associating said assembly thereof with said selecting mechanism, said selecting mechanism arranged to move said associated assembly to situate the punch pins thereof into operative relationship with said code bars, said code bars effective when moved under the control of the movement of corresponding sensing fingers to actuate corresponding punch pins of said selected perforator unit for perforating said unperforated tape in accordance with the movement of said fingers.

5. A gang reperforator comprising a perforated tape sensing mechanism having a sensing finger for each perforation sensing position on said tape, each of said fingers movable in response to the sensing of a corresponding perforation in said tape, a movable normally mechanically locked code bar associated with each sensing finger and arranged mechanically to be unlocked when said corresponding finger senses a perforation in said tape, a plurality of perforator units each having an unperforated tape and a movable assembly of punch pins equal to the number of and corresponding to said code bars, said assembly situated with respect to said code bar such that normally no coaction exists between said code bars and said punch pins, a common oscillating select bar associable with any of said perforator units for moving any of said assemblies, electromagnet means controlled by movement of said sensing fingers for selecting at least one of said perforator units by mechanically associating said assembly thereof with said select bar, said select bar arranged under the control of said electromagnetic means to move said associated assembly to situate all of the punch pins thereof into operative relationship with said code bars, said code bars effective when moved under the control of the movement of corresponding sensing fingers to actuate corresponding punch pins of said selected perforator unit for perforating said unperforated tape in accordance with the moved sensing fingers.

6. A gang reperforator comprising a perforated tape sensing mechanism having a sensing finger for each perforation sensing position on said tape, each of said fingers movable in response to the sensing of a corresponding perforation in said tape, a movable normally mechanically locked code bar associated with each sensing finger and arranged mechanically to be unlocked by said corresponding finger when said corresponding finger senses a perforation in said tape, a plurality of perforator units each having an unperforated tape and a pivotal assembly of punch pins equal to the number of and corresponding to said code bars, said assembly situated with respect to said code bars such that normally no coaction exists between said code bars and said punch pins, a common oscillating select bar associable with any of said perforator units for pivoting any of said assemblies, electromagnetic latching means controlled by movement of said sensing fingers for selecting at least one of said perforator units by mechanically latching said assembly thereof to said select bar, said select bar arranged under the control of said electromagnetic means to pivot said associated assembly to situate all of the punch pins thereof into operative relationship with said code bars, said code bars effective when moved under the control of the movement of corresponding sensing fingers to actuate corresponding punch pins of said selected perforator unit for perforating said unperforated tape in accordance with the moved sensing fingers.

7. A gang reperforator comprising a perforated tape and sensing fingers for sensing the information perforated in said perforated tape, a plurality of perforating units each having an unperforated tape and pivotal punching means for perforating said unperforated tape under control of said sensing fingers, a continuously oscillating selecting bar, latching means individual to each unit for latching respective pivotal punching means thereof to said select bar under control of said sensing fingers, a group of code bars common to all perforator units and moved mechanically under control of said sensing fingers, each of said code bars provided with mechanical means for engaging said punching means for perforating unperforated tape thereby when said punching means is pivoted so as to be engaged by said mechanical means, all of said punching means normally located so as not to be engaged by said mechanical means but selectively pivotal under control of said latching means so as to be selectively engaged by said mechanical means, whereby said sensing fingers upon sensing information perforated in said perforated tape control said latching means in accordance with said sensing information to latch the punching means of selective perforator units to said select bar for pivoting said means into position where same are engaged by said code bars when same are moved mechanically under the control of said sensing fingers in accordance with said sensing information to thereby perforate said unperforated tape of said selected perforated units in accordance with said sensing information.

8. A gang reperforator arrangement comprising a plurality of cams and mechanical means for actuating said cams, a blocking magnet, selecting magnets, a source of electrical energy for operating said magnets, a perforated tape and driving means for advancing said tape in steps, cam actuated means for sensing perforations in said perforated tape for each step position thereof under control of said blocking magnet, and electrical contacts influenced by said sensing means for controlling electrical energy supplied to said selecting magnets, reperforating units, each unit comprising an unperforated tape and driving means for advancing said unperforated tape in steps, and punch means for punching perforations in said unperforated tape for each step position thereof under control of said perforated tape sensing means, a plurality of code bars common to all reperforator units and mechanical means for moving said bars under mechanical control of said perforated tape sensing means, said bars moved in groups in accordance with the design of perforation sensed by said sensing means for each step position of said perforated tape, a cam actuated oscillating select bar common to all reperofrator units, said select magnet selectively energized by said sensing means influenced contacts for each step position of said perforated tape to enable said punching means for selected perforated units to be operated by certain of said code bars permitted to move by said sensing means, whereby for each step position of said perforated tape the information represented by the perforations sensed in said position is repeated by suitable punched perforations in said unperforated tapes of reperforating units selected for reproduction therein of said information in accordance with the information sensed, mechanical means for checking correct movement of said code bars for each step position of said perforated tape and electrical contacts influenced by said checking means to control electrical energy supplied to said blocking magnet to block the stepping operations concerned with said perforated tape in the event said checking means detects incorrect movement of said code bars.

HAROLD W. GOFF.

REFERENCES CITED

The following references are of record in the file of this patent:

UNITED STATES PATENTS

| Number | Name | Date |
| --- | --- | --- |
| 2,112,951 | Carpenter et al. | Apr. 5, 1938 |
| 2,204,957 | Carpenter et al. | June 18, 1940 |
| 2,386,763 | Williams | Oct. 16, 1945 |
| 2,473,437 | Mallina | June 14, 1949 |